United States Patent [19]

D'Amato et al.

[11] Patent Number: 5,511,083
[45] Date of Patent: Apr. 23, 1996

[54] POLARIZED FIBER LASER SOURCE

[75] Inventors: Francis X. D'Amato, deceased, late of Holden, Mass., by Mary A. D'Amato, Administratrix of Estate; Gary A. Ball, Simsbury; Gerald Meltz, Avon, both of Conn.

[73] Assignee: United Technologies Corporation, Hartford, Conn.

[21] Appl. No.: 398,206

[22] Filed: Mar. 2, 1995

[51] Int. Cl.⁶ .................................................. H01S 3/30
[52] U.S. Cl. .................... 372/6; 372/27; 372/64; 372/96; 372/102
[58] Field of Search .................. 372/6, 92, 102, 372/27, 64, 96

[56] References Cited

U.S. PATENT DOCUMENTS

| | | | |
|---|---|---|---|
| 4,725,110 | 2/1988 | Glenn et al. | 350/3.61 |
| 4,807,950 | 2/1989 | Glenn et al. | 350/3.61 |
| 5,042,897 | 8/1991 | Meltz et al. | 385/37 |
| 5,048,913 | 9/1991 | Glenn et al. | 385/37 |
| 5,061,032 | 10/1991 | Meltz et al. | 385/37 |
| 5,103,456 | 4/1992 | Scifres et al. | 372/102 |
| 5,237,576 | 8/1993 | DiGiovanni et al. | 372/6 |
| 5,257,273 | 10/1993 | Farries et al. | 372/102 |
| 5,305,335 | 4/1994 | Ball et al. | 372/6 |
| 5,317,576 | 5/1994 | Leonberger et al. | 372/6 |
| 5,422,897 | 6/1995 | Wyatt et al. | 372/102 |

OTHER PUBLICATIONS

Applied Phys., vol. 43, No. 5, May 1972, pp. 2327–2335, H. Kogelnik and C. V. Shank, "Coupled–Wave Theory of Distributed Feedback Lasers".

Optic Letters, vol. 19, No. 24, Dec. 15, 1994, pp. 2101–2103, J. T. Kringlebotn et al., "$Er^{3+}$:$YB^{3+}$–codoped fiber distributed–feedback laser".

Optical Society of America, Optical Fiber Communication Conference, 1990 Technical Digest Series, vol. 1, 22–26 Jan. 1990, G. Meltz et al., "In–fiber Bragg grating tap".

Primary Examiner—Leon Scott, Jr.
Attorney, Agent, or Firm—Gerald L. DePardo

[57] ABSTRACT

A polarized fiber laser source includes a fiber laser 10 comprising a pair of Bragg gratings 14,16 at opposite ends of a fiber laser cavity 18 which is doped with a rare-earth dopant so as to allow lasing to occur at a lasing wavelength $\lambda_L$. A grating tap 26 is provided along a portion of the laser cavity 18 to couple-out a predetermined amount of light along one polarization, e.g., the "s" polarization", at the lasing wavelength $\lambda_L$. This causes one polarization mode to experience more loss than the other, thereby allowing the fiber laser to lase only on the less lossy polarization mode and causing the laser output light 40 to be polarized only along such polarization.

13 Claims, 2 Drawing Sheets

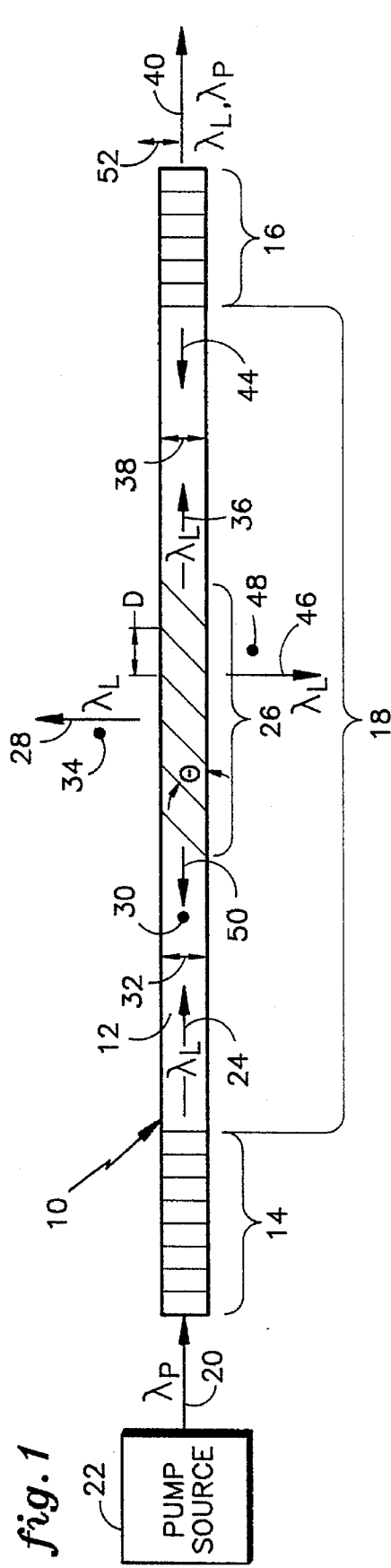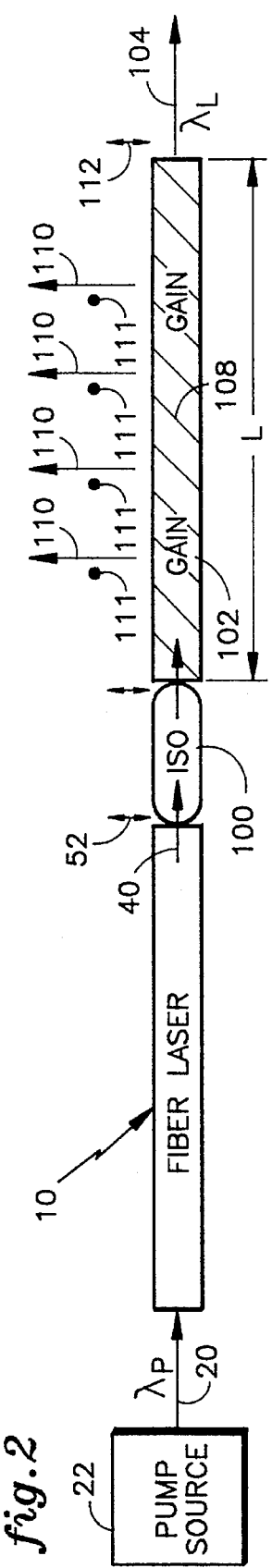
*fig.1*
*fig.2*

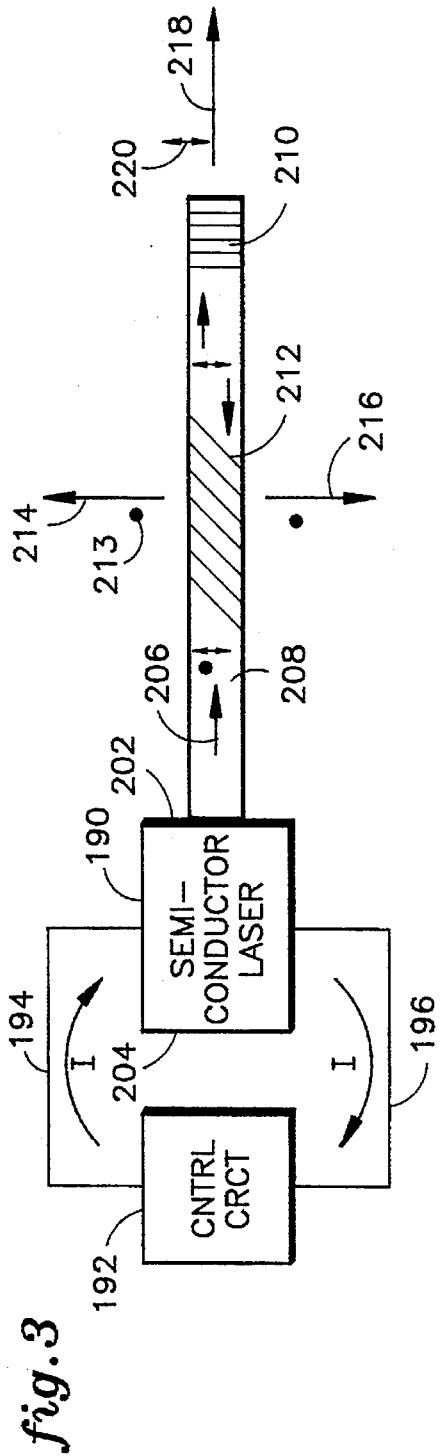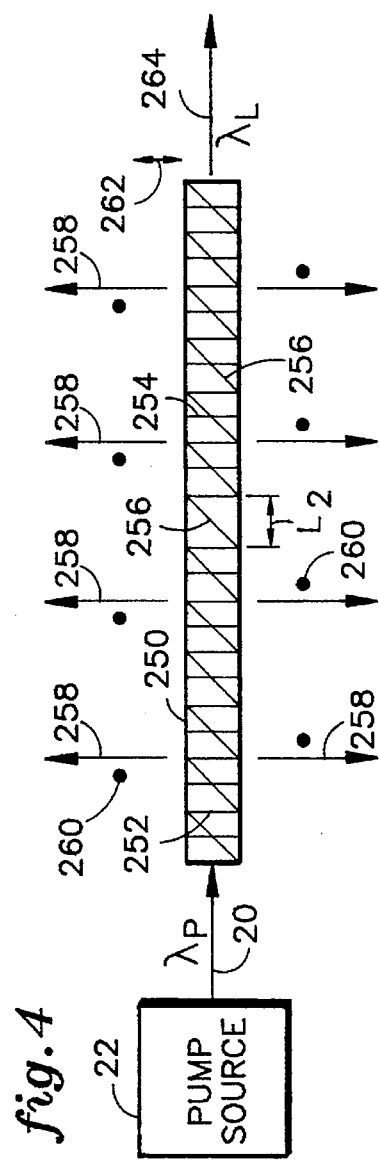

POLARIZED FIBER LASER SOURCE

CROSS REFERENCES TO RELATED APPLICATIONS

Copending U.S. patent application, Ser. No. 08/397,467, entitled, "Single Polarization Fiber and Amplifier", filed contemporaneously herewith, contains subject matter related to that disclosed herein.

TECHNICAL FIELD

This invention relates to fiber lasers and more particularly to polarization controlled fiber lasers.

BACKGROUND ART

It is known in the art of fiber lasers that a fiber laser comprises a length of optical fiber (or laser cavity) which is doped with an optically active rare-earth ion (or gain medium), e.g., Neodymium or Erbium, and has optical reflectors spaced apart by a predetermined distance along the fiber with the gain medium therebetween. The fiber is optically pumped by pump light having a predetermined pump wavelength which excites the gain medium such that the population of excited atoms is greater than the population of unexcited (or less excited) atoms in the lasing transition (known as population inversion). As the energy of the atoms in the gain material transition back to their original unexcited state (or a lower energy level), photons are emitted at a predetermined lasing wavelength. Such emitted photons cause (or stimulate) other excited atoms in the gain medium to emit similar photons, thereby creating the well known lasing effect. The optical reflectors are designed to reflect a predetermined amount of light at the lasing wavelength and the length of the cavity and the amount of cavity gain is set so as to cause light at the lasing wavelength to continuously oscillate within the cavity to allow lasing to be sustained. Also, at least one of the reflectors does not reflect light at the pump wavelength, thereby allowing the pump light to enter the cavity through one of the end reflectors.

It is also known that such reflectors may be Bragg gratings which are impressed into the optical fiber, as discussed in U.S. Pat. Nos. 4,807,950 and 4,725,110 entitled "Method for Impressing Gratings within Fiber Optics", both to Glenn et al.

Such a laser can be designed and fabricated so as to achieve single longitudinal mode lasing performance with narrow linewidth and continuous tunability over a predetermined wavelength range, as is discussed in U.S. Pat. Nos. 5,305,335, entitled "Single Longitudinal Mode Pumped Optical Waveguide Laser Arrangement", to Ball et al, and U.S. Pat. No. 5,317,576, entitled "Continuously Tunable Single-Mode Rare-Earth Doped Pumped Laser Arrangement", to Ball et al.

Such a laser can be designed and fabricated so as to achieve single longitudinal mode lasing performance with narrow linewidth and continuous tunability over a predetermined wavelength range, as is discussed in U.S. Pat. Nos. 5,305,335, entitled "Single Longitudinal Mode Pumped Optical Waveguide Laser Arrangement", to Ball et al, and U.S. Pat. No. 5,317,576, entitled "Continuously Tunable Single-Mode Rare-Earth Doped Pumped Laser Arrangement", to Ball et al.

Such fiber laser sources offer the possibility of improved performance characteristics such as higher power and narrower linewidth when compared to semiconductor laser sources and diode pumped solid state laser sources commonly used in fiber optic systems.

However, such prior art laser sources do not provide a simple inexpensive means for controlling the polarization state of the output light from the laser. Such polarization control of the output light from the fiber laser is desirable if the fiber laser is used as a source to provide light to polarization sensitive fiber components such as fiber couplers, waveguide devices, or polarization sensitive optical modulators. Also, having polarization control is useful if a plurality of fiber lasers output lights are to be combined.

Further, because most optical fibers have some amount of birefringence (i.e., a slightly different refractive index for the two polarizations), and because the process of writing fiber gratings induces a slight birefringence in the fiber grating, the output light from a fiber laser will generally be randomly elliptically polarized.

Alternatively, the fiber laser cavity may be made from polarization preserving (or maintaining) fiber; however, such fiber will not prevent lasing on more than one polarization mode.

Thus, it would be desirable to provide a fiber laser which has consistent polarization control of the laser output light.

DISCLOSURE OF INVENTION

Objects of the invention include provision of a fiber laser source which has a predetermined polarization controlled output light.

According to the present invention a polarization controlled waveguide laser comprises a solid optical waveguide which propagates laser light having polarization components along a first polarization mode and along a second polarization mode; a pair of reflective elements disposed a predetermined distance apart along said waveguide, each reflecting said laser light; a portion of said waveguide between said reflective elements being a gain medium; one of said reflective elements passing a predetermined amount of said laser light as a laser output light; and a grating tap having a predetermined angle, grating spacing, grating length, and grating strength, such that a predetermined amount of said laser light along said first polarization mode is coupled out of said waveguide so as to cause sufficient loss along said first polarization mode to not allow lasing to occur along said first polarization mode and such that a sufficient amount of said laser light along said second polarization mode is not coupled out of said waveguide so as to allow lasing to be sustained along said second polarization mode, thereby causing said output light to be polarized only along said second polarization mode.

According further to the present invention, at least one of the reflective elements comprises a Bragg grating. Still further according to the present invention the angle of the grating tap is about 45 degrees. In further accord to the present invention, the waveguide comprises polarization maintaining optical fiber.

The invention represents a significant improvement over the prior art by providing a predetermined polarization control of laser output light from a fiber laser. The invention places a Bragg grating oriented at a predetermined angle and grating spacing so as to couple-out a predetermined amount of one polarization state at the lasing frequency from the laser cavity, thereby suppressing such state without introducing significant loss into the orthogonal polarization state upon which lasing will occur. Also, it is not essential that the grating reject a high percentage of the polarization state being suppressed, but rather it need only couple out more light along the polarization state to be suppressed than the orthogonal polarization state on which lasing occurs. In particular, the invention introduces sufficient loss in the polarization mode to be suppressed such that the lasing condition (i.e., the gain times the loss is greater than or equal to one) is not met for that polarization mode, while allowing such lasing condition to be met for the orthogonal polarization mode. Thus, the angled (or slanted) Bragg grating controls the polarization state of the fiber laser output light. Furthermore, use of an in-fiber Bragg grating for such polarization control eliminates the need for cutting, splicing, or grinding the fiber laser cavity, thereby allowing for easy fabrication, minimizing cavity losses, and placing minimal constraints on the eventual packaging of the overall fiber laser.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 1 is a schematic block diagram of a polarization controlled fiber laser source, in accordance with the present invention.

FIG. 2 is a schematic block diagram of a polarization controlled master oscillator power amplifier (MOPA) arrangement, in accordance with the present invention.

FIG. 3 is a schematic block diagram of a polarization controlled external cavity semiconductor laser, in accordance with the present invention.

FIG. 4 is a schematic block diagram of a polarization controlled distributed feedback fiber laser, in accordance with the present invention.

BEST MODE FOR CARRYING OUT THE INVENTION

Referring to FIG. 1, a polarization controlled fiber laser 10 includes a predetermined length of optical fiber 12 having Bragg gratings 14,16 embedded in the core of the fiber a predetermined distance apart along the fiber 12. Between the gratings 14,16 is a region of fiber 18 of which all or a portion thereof is doped with a predetermined rare-earth dopant (or gain or active medium), e.g., Erbium, Neodymium, etc., which acts as a laser cavity. Also, the section of fiber where the gratings are located may also be doped if desired. A Bragg grating, as is known, is a periodic variation in refractive index of the fiber core which has a reflectivity profile which reflects a predetermined narrow wavelength band of light and passes all other wavelengths. The gratings 14,16 have a grating spacing so as to provide a peak reflectivity at a lasing wavelength $\lambda_L$ (e.g., 1550 nanometers, for an erbium-doped cavity) of the fiber laser.

The gratings 14,16 and the doped fiber cavity 18 make up the three fundamental elements of a typical fiber laser, such as is described in U.S. Pat. No. 5,305,335, entitled "Single Longitudinal Mode Pumped Optical Waveguide Laser Arrangement", to Ball et al, and U.S. Pat. No. 5,317,576, entitled "Continuously Tunable Single-Mode Rare-Earth Doped Pumped Laser Arrangement", to Ball et al., as well as U.S. Pat. No. 5,237,576 entitled "Article Comprising an Optical Fiber Laser" to DiGiovanni, all of which are incorporated herein by reference.

More specifically, the fiber laser 10 is pumped by input pump light 20 from a pump light source 22, e.g., a laser diode. The pump light 20 has a pumping wavelength $\lambda_P$, e.g., 980 or 1480 nanometers (for an erbium-doped laser cavity) and may be randomly elliptically polarized. Other pump wavelengths may be used if desired provided it is within the absorption band of the rare-earth dopant of the laser cavity. The pump light passes through the grating 14 (because the pump wavelength $\lambda_P$ is not in the reflection wavelength band of the grating 14) and enters the laser cavity 12. The pump wavelength $\lambda_P$ excites the gain medium portion of the cavity 18 to a level where lasing occurs. The gain medium then emits photons at the lasing wavelength $\lambda_L$, as indicated by a line 24. The light 24 is incident on an embedded angled (or slanted) fiber Bragg grating tap 26 having an angle θ (relative to the longitudinal axis of the fiber) and a spacing D between peaks in the refractive index perturbation, so as to efficiently couple light at the lasing wavelength(s) $\lambda_L$ and at one polarization out of the fiber core, as indicated by a line 28 (discussed more hereinafter). The grating tap 26 is written into the fiber core in a manner similar to that discussed in U.S. Pat. No. 5,016,032, entitled "Optical Waveguide Embedded Light Redirecting and Focusing Bragg Grating Arrangement", to Meltz et al, and U.S. Pat. No. 5,042,897, entitled "Optical Waveguide Embedded Light Redirecting Bragg Grating Arrangement", to Meltz et al, both incorporated herein by reference. Any other technique for impressing the gratings into the fiber may be used if desired. It should be understood that the grating spacing for the end gratings 14,16 will be different than (i.e., closer than) the perturbation spacing for the angled grating tap 26 because they reflect the same wavelength (i.e., the lasing wavelength $\lambda_L$).

In a conventional fiber laser the light 24 within the laser cavity is composed of light which has polarization components along two optical orthogonal polarization states (or axes or modes), i.e., the "s" polarization state as indicated by a dot 30 and/or the orthogonal "p" polarization state as indicated by a line 32. However, in the present invention, the grating tap 26 acts as a polarizing element by reflecting a predetermined amount, e.g., 2%, of the incident radiation in the "s" polarization while reflecting a minimal amount, e.g., less than 0.1%, of incident radiation in the "p" polarization.

As such, the light 28, which is tapped-out of the laser cavity, consists primarily of light polarized along the "s" polarization state, as indicated by a dot 34. Accordingly, light which passes through the slanted grating tap 26, as indicated by a line 36, has a preferential polarization along the "p" polarization state, as indicated by a line 38. Therefore, the light 36 that passes through the grating tap 26 will be 98% of the "s" polarized light that was incident on the grating tap 26 and 99.9% of the "p" polarized incident light on the grating tap 26. Other grating tap percentages may be used if desired, as discussed hereinafter.

The gratings 14,16 for a fiber laser, as discussed hereinbefore, are designed to have a narrow reflection wavelength at the lasing wavelength $\lambda_L$. Typically, the front grating 14 reflects 98% of light at the lasing wavelength $\lambda_L$ and the back grating 16, from which the output laser light exits, typically reflects 98% of the cavity light 36 at the lasing wavelength $\lambda_L$. Other percent reflectivities may be used if desired. The light 36 at the lasing wavelength $\lambda_L$ that passes through the back grating 16 exits the laser as output laser light, as indicated by a line 40. As is known, for lasing to be sustained, the lasing condition (or lasing threshold) must be met (i.e., the round trip small signal gain times the round trip loss for light within the cavity is greater than or equal to one). This is accomplished by setting the amount of gain, the length of the cavity, and the reflectivity of the gratings so as to meet this condition. It should be understood that the length of the cavity is not critical to the present invention, i.e., the invention will work on any length cavity.

Symmetrically, a predetermined amount of the cavity light 36 reflects off the back grating 16, as indicated by a line 44. The light 44 is incident on the grating tap 26 which reflects the aforementioned predetermined amount of light at the lasing wavelength out of the cavity, as indicated by a line 46 having a polarization along the "s" polarization state, as indicated by a dot 48. As such the portion of the light 44 which passes through the grating tap 26, as indicated by a line 50 is primarily polarized along the "p" polarization state, as indicated by the line 32.

Because the light having the "p" polarization state is not tapped out of the cavity by the grating tap 26, and the amount of cavity loss (passed light) associated with the gratings 14,16 is the same for both polarizations, the loss of light oscillating in the laser cavity is lower for the "p" polarized light than the "s" polarized light. As a result, the "s" polarized light is essentially suppressed from lasing because the fiber laser will lase on the most efficient optical longitudinal mode. In particular, the loss in the "s" polarization is increased such that the lasing threshold is not achieved, whereas the "p" polarization mode is above the lasing threshold. Consequently, the output laser light 40 exiting the cavity is "p" polarized, as indicated by a line 52.

In order to suppress the unwanted polarization state of the oscillating longitudinal mode, the grating tap 26 introduces more than 1% single pass loss into the cavity. This performance can easily be achieved using a "weak" fiber Bragg grating tap, e.g., a 1.0 cm long grating having a $\Delta n$ of $2.66 \times 10^{-4}$, and an n=1.46; thus $\Delta n/n = 0.000182$ or 0.02% fractional index change. Other grating lengths and/or $\Delta n/n$ may be used if desired. It is known in the art how to fabricate grating taps to couple-out a predetermined amount of incident light. In general, the longer the grating tap, the more light that is coupled-out of the cavity. Also, the "stronger" the grating tap (i.e., the larger the change in refractive index of the grating), the more light that is coupled-out of the cavity. A more detailed discussion of the amount of light coupled-out of a fiber for a given grating tap length and strength ($\Delta n/n$) is provided in Copending U.S. patent application, Ser. No. 08/397,467, entitled, "Single Polarization Fiber and Amplifier", filed contemporaneously herewith.

The precise amount of intracavity loss that must be introduced to suppress the unwanted polarization state from lasing is determined by the particular laser design; however, a 1% single pass loss should be sufficient to ensure single polarization output for a short fiber laser, e.g., less than 10 cm. More specifically, as is known, suppression of adjacent longitudinal modes is achieved by use of Bragg grating reflectors having narrow bandwidth, typically 0.1 to 0.2 nanometer (nm) full-width-half-max, thereby providing substantially single mode fiber laser operation. Because the degree of differential loss that is required to suppress one polarization state from lasing should be substantially less than that required to suppress adjacent longitudinal lasing modes of the fiber laser. As such, 1% single-pass loss for the grating tap 26 should be sufficient to ensure single polarization of the output laser light 40 and less than 1% loss may likely be sufficient in many instances.

It is known that a short slanted grating tap exhibits polarization sensitive reflection as is discussed in the article: G. Meltz et al, "In-fiber Bragg Grating Tap", Optical Fiber Communication Conference, 1990 Technical Digest Series, Vol. 1 (Jan. 1990). In that article, a short (5 mm) grating tap was formed in a polarization maintaining fiber to illustrate this principle. It is also known that the sensitivity of the slanted grating tap 26 to the polarization of incident light is related to the optical theory on Brewster's angle. In particular, the grating 26 reflects light polarized normal to the plane of incidence (or parallel to the reflecting surface of the tap, or "s" polarized in FIG. 1), independent of the angle of incidence. However, light polarized parallel to the plane of incidence (or normal to the reflecting surface, or "p" polarized in FIG. 1) and incident on the grating at the Brewster's angle, is transmitted with minimal reflection. Thus, the angle of the grating tap 26 should be set such that the cavity light incident on the grating tap is incident on the tap at the Brewster's angle. The Brewster's angle for a small fractional refractive index change ($\Delta n/n$) at the reflection interface, e.g., 0.05–0.1% (which is typical for a Bragg grating), is approximately 45 degrees; however, even for "strong" gratings (e.g., $\Delta n/n = 0.5\%+$), the angle is close to 45 degrees. More specifically, the known relationship for the Brewster's angle is:

$$\text{Tan } \theta_p = n_t/n_i \qquad [\text{Eq. 1}]$$

where $\theta_p$ is the angle of incidence of the light incident on the tap, $n_t$ is the refractive index of the grating tap, and $n_i$ is the incident refractive index outside the grating tap. Thus, the grating tap 26 will typically be set at about 45 degrees from the longitudinal axis of the fiber so as to allow the tap to reflect only light polarized parallel to the reflecting surface of the grating tap. Other values for the angle θ of the tap 12 may be used if desired based on the $\Delta n$ for the grating tap used in a given case.

Although the invention has been described as using a Bragg grating at either end of the gain cavity, the polarization controlling concept of the present invention applies equally well to fiber laser cavities which use more conventional mirrors, such as dielectrics or other reflecting surfaces, for optical cavity feedback. Also, it should be understood that the fiber grating tap of the present invention could also be used to control the polarization of a fiber ring resonator in the same way as it is used to control the polarization of a standing wave laser cavity of FIG. 1.

Also, although the grating tap 26 is shown to be in the center of the laser cavity 18, it may be placed anywhere along the laser cavity between the two reflectors 14,16.

Also, because the wavelength band of the out-coupling loss for an angled grating is broad, e.g., 10 nanometers (which is broader than the direct reflection wavelength profile for straight gratings), the invention can be used to control the polarization for a multiple longitudinal lasing mode fiber laser, provided that sufficient loss is introduced in one polarization mode for selected longitudinal modes so that such longitudinal modes are below the lasing threshold such and do not lase. Thus, the invention will work equally well with single or multiple longitudinal mode fiber lasers.

Further, it should be understood that the fiber laser may be made of polarization preserving (or maintaining) fiber. In that case, the lasing polarization can be easily identified at the end of the fiber for connection to down-steam optical components. Also, the fiber laser may be made of a fiber having more than one spatial mode (i.e., multi-spatial mode fiber). In that case, the polarization of light propagating along each mode may be coupled out of the laser by one or more slanted grating taps (depending on the magnitude of the difference between the optical frequency associated with each spatial mode and the bandwidth of the grating tap) in a manner similar to that described in U.S. Pat. No. 5,048,913, entitled "Optical Waveguide Embedded Transverse Spatial Mode Discrimination Filter", to Meltz et al.

Referring now to FIG. 2, the invention will work equally well in a Master Oscillator Power Amplifier (MOPA) arrangement, similar to that described in copending U.S. patent application, Ser. No. 08/013,490, "Embedded Bragg Gating Pumped Optical Waveguide Laser Source/Power Amplifier Arrangement", to Ball et al. In particular, the polarization controlled fiber laser 10 is connected to an optical isolator 100. The output of the isolator 100 is connected to a optical fiber amplifier 102, which comprises an optical fiber doped with a rare-earth dopant (or gain medium), e.g., erbium. The isolator 100 prevents light emitted from the amplifier 102 from entering and disrupting the operation of the fiber laser 10.

As discussed hereinbefore, the light 40 comprises light at the pump wavelength $\lambda_P$ that was not absorbed by the gain medium in the fiber laser 10 as well as light at the lasing wavelength $\lambda_L$. The light 40 exits the fiber laser 10, passes through the isolator 100 and enters the amplifier 102, where the pump wavelength $\lambda_P$ excites the gain medium of the amplifier 102. The gain medium emits light 104 at the lasing wavelength $\lambda_L$ having a higher intensity than the light 40 at the lasing wavelength that exited the laser 10. The fiber amplifier 102 has a grating tap 108, similar to the tap 26 within the fiber laser 10, which extends along the entire length or a substantial portion of the length of the fiber amplifier 102. The tap 108, similar to the tap 26, is oriented at an angle and has a grating spacing so as to couple light 110 out of the fiber 102 having one polarization (e.g., dot 111) and pass the light 104 having the orthogonal polarization (e.g., line 112). The polarization of the light 40 exiting the fiber laser 10 is aligned with the polarization axis which is passed by the amplifier 102. The opposite polarizations may be used, if desired.

Use of the grating tap 108 allows only the polarization of the output light 40 from the laser 10 to be passed by the amplifier 102, thereby ensuring that the output light 104 will be polarized along the same polarization mode as the output of the laser 10 (i.e., along line 112). Also, if the light 40 from the laser 10 had some component in the undesired polarization, the tap 108 will further attenuate that component at the output. Also, instead of or in addition to the grating tap 108, the fiber 102 may be polarization preserving (or maintaining) fiber. In that case, if the grating tap 108 is also used, tap need not extend over the entire length of the fiber amplifier. The continuous grating tap 108 in the MOPA amplifier 102 is also discussed in copending U.S. patent application, Ser. No. 08/397,467, entitled, "Single Polarization Fiber and Amplifier", filed contemporaneously herewith.

Alternatively, instead of using the polarization controlled fiber laser 10 as the fiber laser in FIG. 2, a conventional fiber laser without polarization control may be used. In that case, the light 40 would be elliptically polarized and the grating tap 108 would couple at a predetermined portion of laser light along one polarization (e.g., dot 111) and pass the other polarization mode (e.g., line 112). Thus, the output light 104 would have a preferential polarization along the line 112.

Referring to FIG. 3, the invention will also work with an external cavity semiconductor laser. In that case, a semiconductor laser 190 (e.g., a laser diode) is electrically pumped by a control circuit 192 which provides a current loop I along the lines 194, 196. The laser diode 190 has a front facet 202 and a rear facet 204. The front facet 202 is coated with an anti-reflection (AR) coating which allows laser light within the semiconductor laser 190 to not be reflected by the front facet 202. An optical fiber 206 is connected to the laser diode front facet 202 at one end and has a straight grating 210 embedded at the opposite end. The grating 210 acts as one laser cavity reflector, and the facet 204 is the other reflector. An angled grating tap 212 is embedded in the fiber 208 and reflects one polarization (e.g., a dot 213) out of the fiber 208 as indicated by lines 214, 216. Consequently, the external cavity semiconductor laser will have more loss along one polarization than the other and lase on the less lossy polarization mode. Thus, the output light 218 will be polarized along one polarization (e.g., the line 280). Also, the fiber 208 is typically not a gain medium. Further, there may be a lens (not shown) between the laser diode and the fiber pigtail to allow the light to be efficiently coupled into the fiber.

Referring to FIG. 4, the invention will also work equally well with a distributed feedback laser. In that case, the pump light 20 from the pump source 22 is provided to a fiber 250 having 2 gratings 252,254 which extend from opposite ends of the fiber 250 toward the middle thereof, but end a predetermined distance 11 from each other, e.g., one quarter of a lasing wavelength, so as to support single longitudinal mode lasing, similar to that discussed in the articles: J. Kringlebotn et al, "Er+3:Yb+3-Codoped Fiber Distributed-Feedback Laser", Optics Letters, Vol. 19, No. 24, pp 2101–2103 (Dec. 1994); and H. Kogelnik et al, "Coupled-Wave Theory of Distributed Feedback Lasers", J. Appl. Phys., Vol. 43, No. 5, pp 2327–2335 (May 1972). An angled grating tap 256, similar to the tap 26, extends over the entire length of the fiber 250 and is oriented at an angle and has a grating spacing so as to a couple-out light 258 of one polarization (e.g., a dot 260) and pass light of the other polarization (a line 262) at the lasing wavelength. Thus, lasing will occur only on the less lossy polarization (262), and the output light 264 will be polarized along that polarization 262. Alternatively, the gratings 252,254 may be replaced with one continuous grating without the quarter wavelength gap. This typically results in multiple longitudinal mode lasing.

Although the lasing frequency (or wavelength) for each polarization mode will be different due to cavity birefringence, the difference between the lasing frequencies for the two polarization modes depends on the amount of fiber birefringence and is typically small. However, to maximize performance of the present invention, the slanted grating may be designed for maximum reflectivity at the lasing frequency associated with the polarization mode being coupled-out of the cavity (and that will not lase).

Also, it should be understood that the invention will work equally well with any solid optical waveguide, e.g., a planar, rib, or channel waveguide, instead of an optical fiber. Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A polarization controlled waveguide laser, comprising:
   a solid optical waveguide which propagates laser light having polarization components along a first polarization mode and along a second polarization mode;
   a pair of reflective elements disposed a predetermined distance apart along said waveguide, each reflecting said laser light;
   a portion of said waveguide between said reflective elements being a gain medium;

one of said reflective elements passing a predetermined amount of said laser light as a laser output light; and a grating tap having a predetermined angle and grating spacing such that a predetermined amount of said laser light along said first polarization mode is coupled out of said waveguide so as to cause sufficient loss along said first polarization mode to not allow lasing to occur along said first polarization mode and such that a sufficient amount of said laser light along said second polarization mode is not coupled out of said waveguide so as to allow lasing to be sustained along said second polarization mode, thereby causing said output light to be polarized only along said second polarization mode.

2. The laser of claim 1 wherein at least one of said reflective elements comprises a Bragg grating.

3. The laser of claim 1 wherein said gain medium comprises a rare-earth dopant.

4. The laser of claim 1 wherein only a single longitudinal mode lases in the laser.

5. The laser of claim 1 wherein said angle of said grating tap is about 45 degrees.

6. The laser of claim 1 wherein said waveguide is polarization maintaining optical fiber.

7. The laser of claim 1 wherein said waveguide is an optical fiber.

8. The laser of claim 1 wherein said waveguide has a plurality of spatial modes.

9. The laser of claim 1 wherein a portion of said waveguide comprises a portion of a semiconductor laser.

10. The laser of claim 9 wherein one of said reflective elements comprises a facet of said semiconductor laser.

11. The laser of claim 1 wherein said reflective elements comprise a distributed feedback arrangement.

12. The laser of claim 1 wherein the laser is optically coupled to an optical amplifier.

13. The laser of claim 1 wherein said optical amplifier comprises polarization maintaining fiber.

* * * * *